United States Patent [19]

Weisflog

[11] Patent Number: 5,661,934
[45] Date of Patent: Sep. 2, 1997

[54] LOADING DOCK BUMPER

[75] Inventor: Clarence R. Weisflog, Cudahy, Wis.

[73] Assignee: CR Industries, Inc., Cudahy, Wis.

[21] Appl. No.: 618,586

[22] Filed: Mar. 20, 1996

[51] Int. Cl.⁶ ............................................. E04D 13/18
[52] U.S. Cl. ........................ 52/173.2; 52/27; 267/139; 267/140
[58] Field of Search .................. 52/173.2, 27; 267/139, 267/140, 141.1, 116, 151–153, 294

[56] References Cited

U.S. PATENT DOCUMENTS

| Re. 28,391 | 4/1975 | Frommelt et al. | 52/173.2 |
|---|---|---|---|
| 3,096,973 | 7/1963 | Bergen | 267/140 |
| 3,539,173 | 11/1970 | Sampson | 267/140 |
| 3,653,173 | 4/1972 | Frommelt et al. | 52/173.2 |
| 3,664,075 | 5/1972 | Hazlewood et al. | 52/173 |
| 3,779,536 | 12/1973 | Lachmann | 267/140 |
| 3,792,559 | 2/1974 | Frommelt et al. | 52/173.2 |
| 3,826,049 | 7/1974 | Frommelt et al. | 52/173.2 |
| 4,062,157 | 12/1977 | Potthoff | 52/173.2 |
| 4,805,362 | 2/1989 | Frommelt et al. | 52/173.2 |
| 5,333,424 | 8/1994 | Chalfant et al. | 52/173.2 |
| 5,442,825 | 8/1995 | Hahn et al. | 52/173.2 |

OTHER PUBLICATIONS

"Super Seal Dock Seals", Super Seal Mfg. Ltd., 1989, p. 8.

*Primary Examiner*—Carl D. Friedman
*Assistant Examiner*—Yvonne Horton-Richardson
*Attorney, Agent, or Firm*—Ryan, Maki, Mann & Hohenfeldt

[57] ABSTRACT

A loading dock bumper assembly includes at least one bracket for mounting the assembly on a surface of a loading dock. At least one resilient bumper component is attached to the bracket, the bumper component formed of a block of resilient recycled plastic material is positioned to receive the impact of a motor vehicle backed into abutment with the dock. The block is preferably formed of extruded high density polyethylene. A side of the block adapted to receive contact with a motor vehicle may be provided with a slot along its length. The slot is adapted to have secured therein a wear bar substantially of equal length with the bumper component. The preferred wear bar is a steel bar of rectangular cross section fitted into the slot with a surface thereof substantially flush with the surface of the resilient component. At least one corner of the block preferably is provided with a chamfer cut at approximately 45° whereby lodging of a truck bumper on the assembly is obviated.

9 Claims, 2 Drawing Sheets

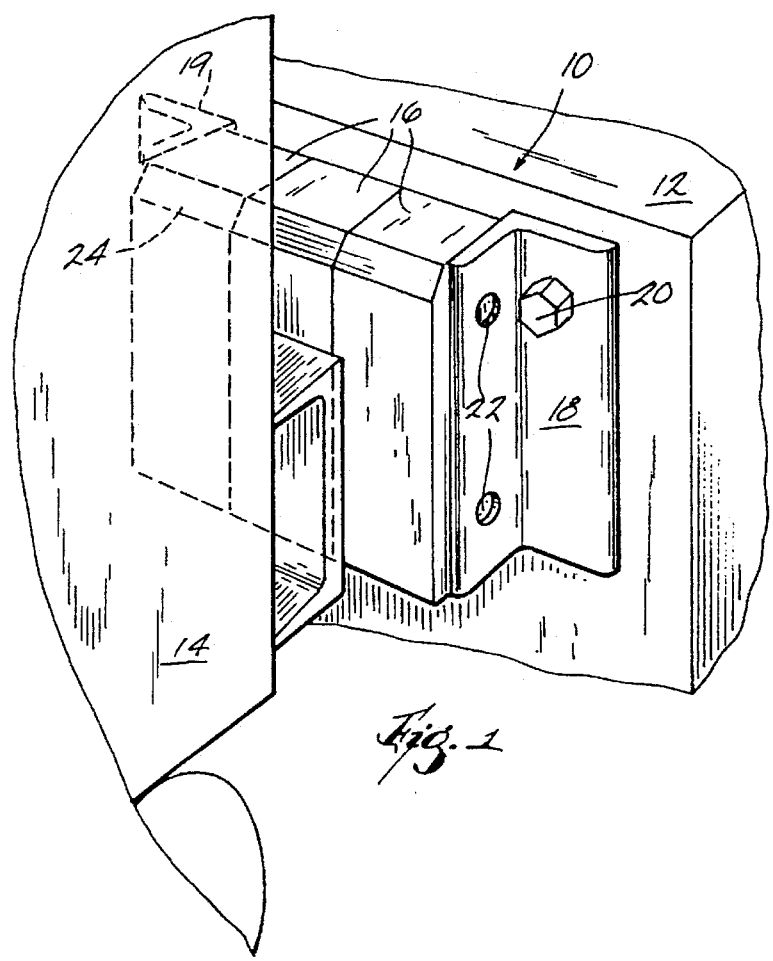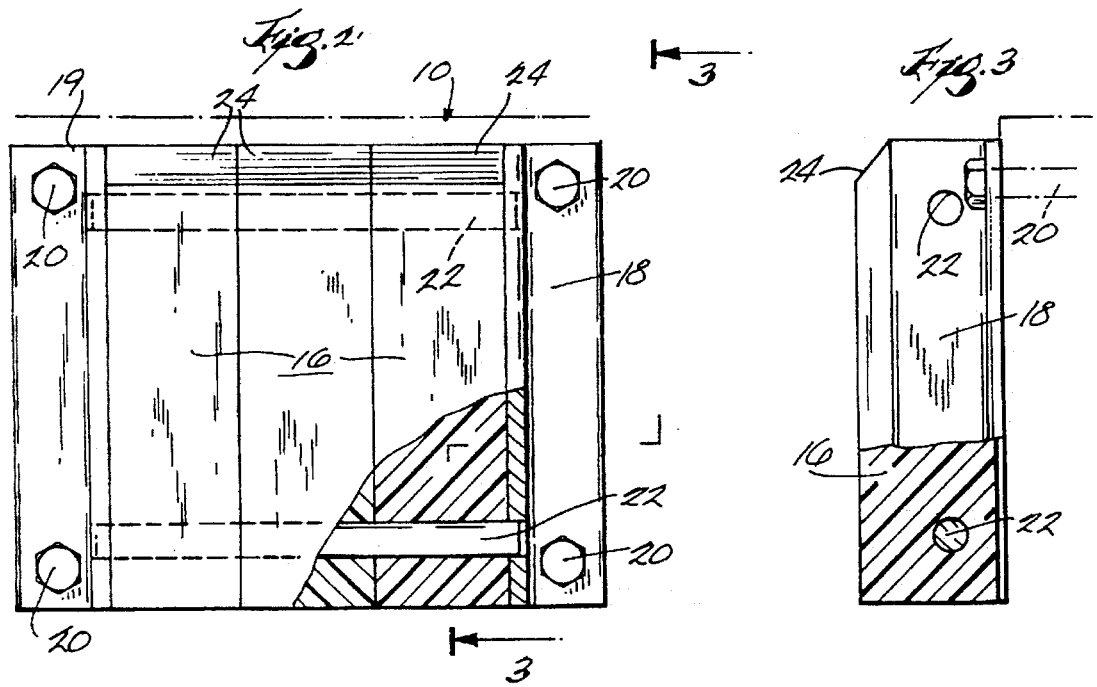

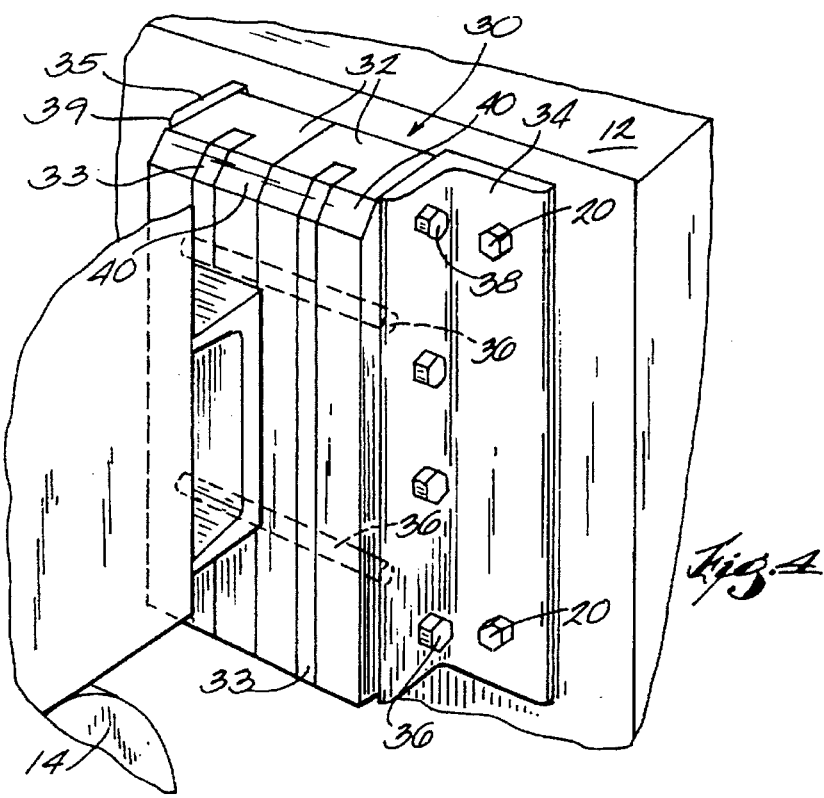
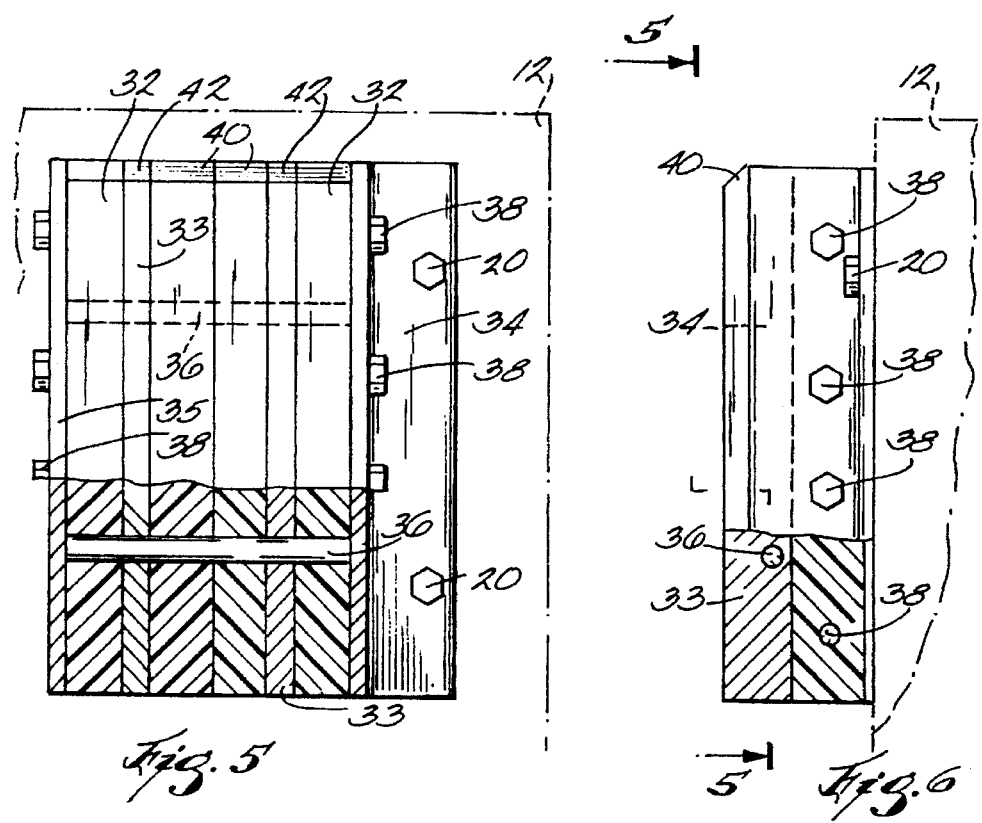

LOADING DOCK BUMPER

FIELD OF THE INVENTION

This invention relates to loading dock bumpers. More particularly the invention relates such bumpers which include a bracket for mounting to a loading dock surface and which include improved shock absorbing components for cushioning the shock between trucks and loading docks during collisions with trucks when they are backed up into contact with the docks

BACKGROUND OF THE INVENTION

Current loading dock bumpers are often constructed from discarded motor vehicle tire carcasses. The bumpers are thus formed from composites of rubber pieces which are trimmed to a desired size. While such composite materials are formed from inexpensive materials, the resulting bumpers have a limited life due to shredding and deterioration of the bumper pads after repeated impacts by trucks.

SUMMARY OF THE INVENTION

It is a principle object of the present invention to provide improved loading dock bumpers for protection of vehicles striking the loading docks as well as the surfaces of the docks themselves. An important aspect of the present invention involves producing such loading dock protective bumpers which utilize inexpensive, preferably recycled materials of construction. A further object of the invention is the provision of such bumpers which have dimensional stability, improved wear resistance and hence a greatly increased service life thus making the bumpers of this invention cost effective to use over the life thereof.

Further aspects of the invention involve the provision of a design that is easy to manufacture, for example, by extrusion and utilizes conventional mounting hardware for ease of application to a loading dock.

Still further aspects of the invention involve providing alternative embodiments wherein a metallic wear strip is included within the front wear surface of a bumper component. A yet a further aspect of the invention involves providing a chamfer at the top of the bumper device in order to prevent the bumper of a truck from becoming lodged on the bumper and becoming supported thereon, thus hanging up the truck or damaging the dock.

Briefly, a loading dock bumper assembly includes at least one bracket for mounting the assembly on a surface of a loading dock. At least one resilient bumper component is attached to the bracket, the bumper component may be formed of a block of resilient recycled plastic material is positioned to receive the impact of a motor vehicle backed into abutment with the dock. The block is preferably formed of extruded high density polyethylene. A side of the block adapted to receive contact with a motor vehicle may be provided with a slot along its length. The slot is adapted to have secured therein a wear bar substantially of equal length with the bumper component. The preferred wear bar is a steel bar of rectangular cross section fitted into the slot with a surface thereof substantially flush with the surface of the resilient component. At least one corner of the block preferably is provided with a chamfer cut at approximately 45° whereby lodging of a truck bumper on the assembly is obviated.

Further objects and advantages of the invention will become apparent from the following detailed description, the claims and the accompanying drawings.

BRIEF DESCRIPTION OF DRAWINGS

FIG. 1 is a fragmentary perspective view showing a bumper of the present invention secured to the face of a loading dock and showing the rear of a truck in conjunction therewith;

FIG. 2 is a front elevational view of a loading dock bumper of FIG. 1;

FIG. 3 is a sectional view with parts broken away taken along line 3—3 of FIG. 2;

FIG. 4 is a fragmentary perspective view showing a bumper in accordance with another embodiment of the invention secured to the face of a loading dock and showing the rear of a truck in conjunction therewith;

FIG. 5 is a front elevational view of a loading dock bumper of FIG. 4; and,

FIG. 6 is a sectional view with parts broken away taken along line 6—6 of FIG. 5.

DETAILED DESCRIPTION OF PREFERRED EMBODIMENTS

Referring more specifically to the drawings there is seen in FIGS. 1–3 one embodiment 10 of a loading dock bumper assembly. Bumper assembly 10 is secured to the face of a loading dock 12 in order to protect the loading dock 12 and a motor truck 14 which is backed up to the loading dock 12 for the purpose of loading and unloading merchandise or equipment.

Bumper assembly 10 includes a plurality of a resilient bumper blocks 16. In the illustrated embodiment 3 blocks are shown, but any desired number can be utilized. Blocks 16 are preferably formed of a recycled material such as a polyolefin that has been produced from reclaimed materials such as waste food containers. A particularly suitable material is high density polyethylene (HDPE) that has been recycled from containers such as plastic milk containers. Other such materials which can optionally be used are recycled polypropylene or a recycled polyester such as polyethylene terephalate. One advantage of the preferred materials is that they can be extruded into linear shapes resembling wood timbers in appearance and subsequently cut to a desired length. The assembly of resilient blocks 16 is mounted in place on dock 12 by brackets 18 and 19. Brackets 18 and 19 are preferably mounted on dock 12 by a conventional mounting means such as lag bolts 20. The blocks 16 are provided with holes to receive pins 22 which retain blocks 16 between the flanges of mounting brackets 18 and 19. As illustrated, brackets 18 and 19 maybe in the form of a steel angle iron. It has been found feasible to simply insert pins 22 into the holes through blocks 16 and the brackets 18 and 19 where they are held in place by friction.

As illustrated the upper corners 24 of blocks 16 are provided with a chamfer for example at 45°. Corresponding chamfers could be cut on the upper corners of brackets 18 and 19, but, in the illustrated embodiment, the projecting edge of brackets 18 and 19 is, instead, recessed away from the forward surface of blocks 16 as shown. Such chamfer cuts 24 have been found to greatly reduce or eliminate the tendency of a truck bumper to ride up on the dock bumper and to become lodged sometimes making it difficult to drive the truck away from the loading dock. If desired, such a chamfer can be provided on both the upper and lower ends of the bumper assembly 10.

An alternative embodiment of the invention is seen in FIGS. 4–6. In this embodiment, a bumper assembly 30 is illustrated which utilizes two resilient bumper blocks 32. As in the case of the earlier illustrated embodiment, while two blocks are shown, any desired number can be utilized. Blocks 32 are preferably formed of a recycled material as in the case of blocks 16. Blocks 32 are provided with a slot along one surface which is provided with a wear bar 33, preferably formed of a metal such as steel. In one preferred embodiment, used as an example herein without limiting the scope of the invention, blocks 32 had a 3.5 inch square cross section while bars 33 were ½ inch thick and 1.5 inch wide with a length equal to that of blocks 32.

The assembly of resilient blocks 32 is mounted in place on dock 12 by brackets 34 and 35. In this example bracket 34 is in the form of an angle iron with holes provided to enable attachment to dock 12 by means of lag bolts 20. Bracket 35 is in the form of a flat plate for engaging the exposed side of the block 32 furthest from bracket 34.

Pins 36 retain blocks 32 and wear bars 33 together as an assembly. Pins 36 serve also to resiliently support the wear bars 33. Pins 36 thus serve to distribute impact loads, thereby offering a cushioning effect which thus prevents damage to the loading dock. A number of bolts 38, four in the illustrated embodiment, retain the blocks 32 and wear bars 33 together with end brackets 34 and 35. Thus assembled together, the assembly is suitable for mounting to dock 12 by means of bolts 20.

While recycled polymeric materials are preferred as a material of construction for blocks 16 or 32 for environmental and economy reasons, it will be appreciated that the invention is not limited to such materials, since polymeric materials derived form other sources will perform equally as well. The preferred materials, however, have been found to provide tough highly protective bumper assemblies which can provide a service life substantially exceeding that of prior materials used for this purpose.

As illustrated, the upper corners 40 of blocks 32 and upper corners 42 of wear bars 33 are provided with a chamfer preferably cut at 45°. Brackets 34 and 35 preferably do not project outwardly so as to interfere with chamfer cuts 40. As in the case of the earlier described embodiment, the chamfer cuts have been found to effective in minimizing the tendency of a truck bumper to ride up and sit on the dock bumper.

While various preferred embodiments of the invention have been shown for purposes of illustration it will be understood that those skilled in the art may make modifications thereof without departing from the true scope of the invention as set forth in the appended claims.

What is claimed is:

1. A loading dock bumper assembly comprising
   at least one bracket for mounting the assembly on a surface of a loading dock,
   at least one resilient bumper component attached to said bracket, said bumper component being adapted to be vertically mounted and positioned to receive the impact of a motor vehicle backed into abutment with said dock, said resilient bumper being formed of a unitary block of resilient plastic material a side of said block adapted to receive contact with a motor vehicle being provided with a vertical slot, said slot having a metal wear bar secured therein.

2. An assembly according to claim 1 wherein said block is formed of extruded, recycled high density polyethylene.

3. Assembly according to claim 2 wherein said block is substantially square in cross section.

4. An assembly according to claim 1 wherein said vertical slot extends along the entire length thereof, and said wear bar is of substantially equal length with said bumper component.

5. A bumper assembly according to claim 4 wherein said wear bar comprises a steel bar of rectangular cross section fitted into said slot with a surface thereof substantially flush with the surface of said resilient component.

6. An assembly according to claim 5 wherein at least a top exposed corner of said block and said wear bar are each provided with a chamfer cut at approximately 45° whereby lodging of a truck bumper on said assembly is obviated.

7. An assembly according to claim 1 wherein said bracket comprises an angle iron.

8. An assembly according to claim 1 wherein said wear bar is resiliently attached to said block by pins extending laterally approximately across the width of said block.

9. An assembly according to claim 1 wherein an angle iron attached to a side of said block forms a bracket along a first side thereof, and a flat metallic bar attached to a second side of said block opposite to said first side together with said angle iron serves to retain said assembly as a unitary composite assembly.

* * * * *